E. G. ROWLEY.
PERCOLATOR.
APPLICATION FILED FEB. 25, 1922.
1,431,490.
Patented Oct. 10, 1922.
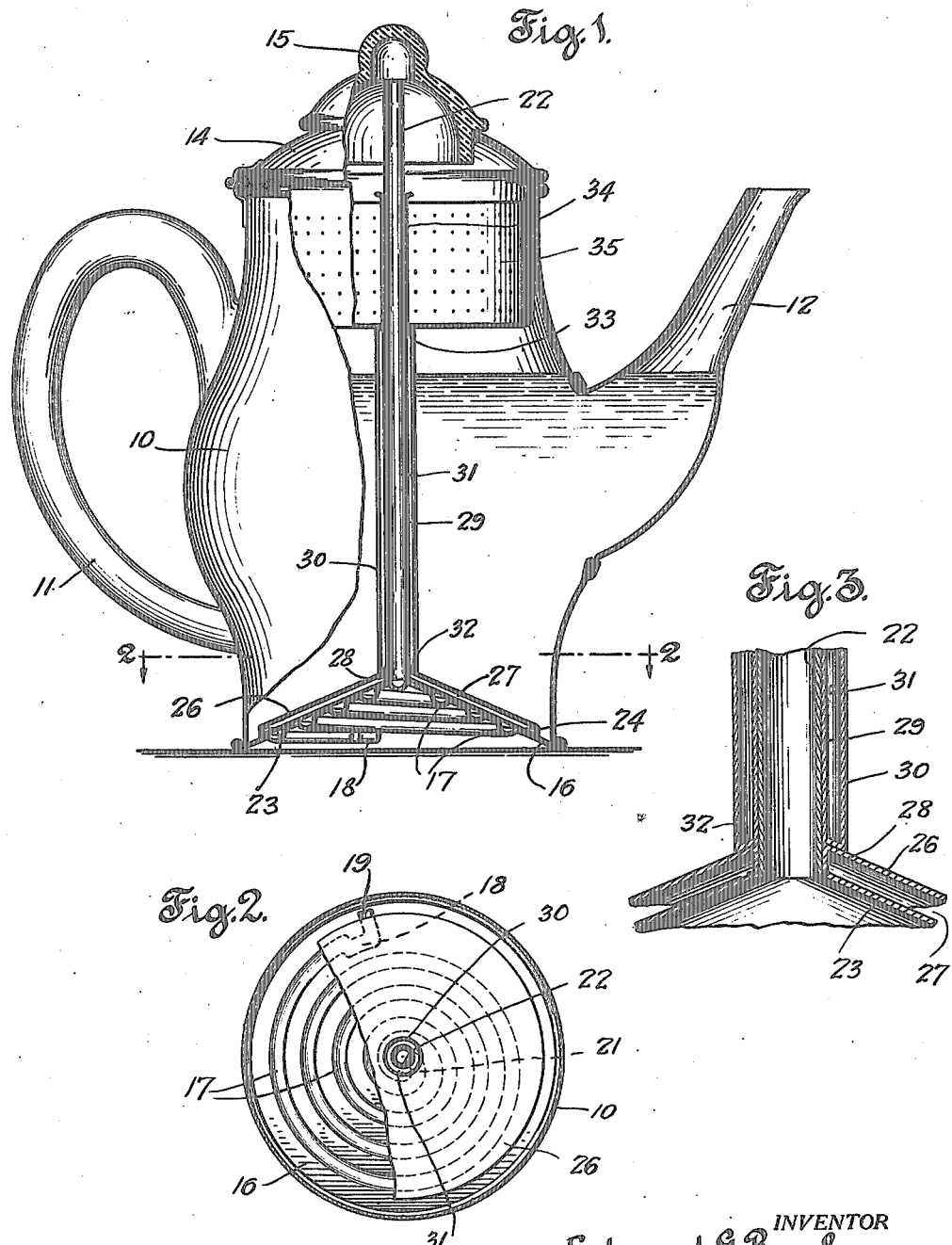
INVENTOR
Edward G. Rowley
BY Fred C. Fischer
ATTORNEY Patented Oct. 10, 1922.

1,431,490

UNITED STATES PATENT OFFICE.

EDWARD G. ROWLEY, OF NEWARK, NEW JERSEY, ASSIGNOR OF ONE-HALF TO SUN TYPEWRITER COMPANY, OF NEWARK, NEW JERSEY, A CORPORATION OF NEW JERSEY.

PERCOLATOR.

Application filed February 25, 1922. Serial No. 539,158.

*To all whom it may concern:*

Be it known that I, EDWARD G. ROWLEY, a citizen of the United States, residing in Newark, county of Essex, and State of New Jersey, have invented certain new and useful Improvements in Percolators, of which the following is a specification.

This invention relates to percolators or that type of cooking utensils in which a liquid is heated and caused to pass through a perforated receptacle containing granular material, whereby a decoction of the same is obtained, and the leading object is to provide a percolator that is specially rapid in operation and effective in results.

A further purpose is in the provision of a percolator particularly adapted for producing the beverage known as coffee in a manner practically instantaneous, without loss of aroma or the essential properties of the roasted and ground berry used.

Another aim is to produce a percolator made in a form based on scientific principles, that is easily operated and readily cleansed after use.

These and allied objects are secured by the novel design, construction, combination and arrangement of parts hereafter described and illustrated in the annexed drawing, constituting an essential part of this disclosure, and in which:—

Figure 1 is a side elevational view showing an embodiment of the invention, parts being in section and others broken away to show the construction.

Figure 2 is a trasverse sectional view taken on line 2—2 of Figure 1.

Figure 3 is an enlarged fragmentary sectional view of interior elements in detail.

A conventional shape of percolator body is designated in the drawing by the numeral 10, the same having a handle 11 and pouring spout 12.

At the top is hingedly engaged a cover 14 in which is mounted the usual bell-shaped or domed glass stop 15.

The invention resides principally in the lower portion of the utensil, its base or bottom plate element 16 being formed conically upward and provided with a volute or spiral groove 17, its outer, lower coil having an offset portion 18 terminating in an open end 19.

The inner convolution is brought to the center as at 21, and opens directly below the tube 22, fixed in the base and extending upward into the bell 15.

Disposed to form a cover for the coils of the groove 17, which are impressed directly into the base plate 16 to form a continuous channel, is a conical plate 23, beyond the periphery of which the opening 19 extends to admit liquid from the interior of the body 10.

At the edge of the plate 23 is a raised annular rim 24, joining a second conical plate 26 having between them an air space 27, the plates 23 and 26 being hermetically connected by a band 28 as well as the rim 24.

Surrounding the tube 22 is the inner wall 29 of a double tube, its outer wall 30 being separated by an annular space 31, closed at the bottom by the end 32, resting on the surface of plate 26, and also closed at the top by a washer-like cap 33, thus presenting another hermetically sealed chamber.

The perforate container or basket 35 rests on the top of the cap 33 and is guided on the tube 22, passing centrally through it, by a sleeve 34 having an out-turned bead which acts as a handle in manipulating the container.

In operation, ground coffee or the like having been supplied to the container 35 and the body suitably filled with water, the utensil is placed over a source of heat.

Water entering the opening 19 fills the coils 17 and may rise in tube 22. Upon the application of heat, ebullition begins in the coils, causing the water to further rise in tube 22 and being diverted by the bell 15, saturates the material in the container 35, dripping back into the body of the percolator charged with the extract.

Due to the offset element 18, back pressure is avoided and by reason of the dead air spaces 27 and 31, the volume of liquid in the body of the percolator is precluded from direct contact with the coils 17 or tube 22, preventing chilling of the liquid circulating therethrough.

As the quantity of liquid in the coils is relatively small and brought into direct contact with the heated surface of the bottom plate 16, an extremely rapid action is attained.

After use the cover 14 is turned upon its hinge, the container 35 removed, whereupon the double walled tube and spaced plates 23—26 can be withdrawn, giving full opportunity for cleansing the interior of the percolator.

From the foregoing it will be seen that a simple device for this purpose has been disclosed in the preferred form of its embodiment, but it is not desired to restrict the details to the exact construction shown, it being obvious that changes, not requiring the exercise of invention, may be made without conflicting with the scope of the appended claims.

Having thus described my invention, what I claim as new and desire to secure by Letters Patent, is:—

1. A percolator comprising a hollow body, a dome shaped cover, a concavely conical bottom, a spiral recess in said bottom, a conical plate covering said recess except at the end of the open outer coil thereof, and a tube communicating with the inner end of said coil, said tube extending into said domed cover.

2. A percolator comprising a hollow body, a dome shaped cover, a conically raised bottom, a recess impressed in said bottom, said recess being in the form of a spiral coil, a cover overlying said recess, the outer end of which recess is open to the interior of said body, a tube communicating with the inner end of said recess, said tube extending into said domed cover, and a double walled casing surrounding said tube, the space between the walls of said casing being hermetically sealed.

3. A percolator comprising a hollow body, a dome shaped cover, a conically raised bottom, a recess impressed in said bottom, said recess being in the form of a spiral coil, a double walled conical cover overlying said recess, the space between the walls of said cover being hermetically sealed, and a tube communicating with the inner end of said recess extending upwardly into said body, the outer end of said recess being open.

4. A percolator comprising a hollow body, a container therein, an inreaching conical bottom having a depressed volute recess, the outer end of the recess having an offset portion open to the interior of said body, a tube communicating with the inner end of said recess, said tube extending through said container, a double walled cover for the recess enclosing a hermetically sealed space, and a double walled casing for said tube, said casing supporting said container and enclosing a hermetically sealed space circumjacent said tube.

5. A percolator comprising a hollow body, a container therein, a bell-shaped cover, an inreaching conical bottom impressed with a scroll, a cover over the scroll, a tube leading from the inner end of said scroll through said container into said ball-shaped cover, the outer end of said scroll being open to the interior of said body, means preventing back pressure in said scroll, and means for insulating said coil from the interior of said body.

6. A percolator comprising a hollow body having an inwardly extending conical bottom, a chamber having spaced walls, the lower wall resting on said bottom, a circuitous volute channel formed in said base having its outer end extending beyond said cover, a tube communicating with the inner end of said channel, extending upwardly through said body, and means circumjacent said tube adapted to insulate it from the interior of said body, said chamber and casing being removably engaged in the body.

7. A percolator comprising a hollow body, channels in the bottom thereof adapted to conduct heat to liquid therein causing circulation, means partially insulating said channels from the interior of said body, and insulated means for delivering liquid from said channels to the upper part of said body.

8. A percolator comprising a hollow body, channels in the bottom thereof adapted to conduct heat to liquid therein causing circulation, means partially insulating said channels from the interior of said body, and means in said channels adapted to prevent a return current through said channels.

This specification signed and witnessed this 24th day of February, 1922.

EDWARD G. ROWLEY.

Witnesses:
FRED'K C. FISCHER,
FERDINAND NOLL.